United States Patent [19]

Lee

[11] Patent Number: 5,327,249

[45] Date of Patent: Jul. 5, 1994

[54] APPARATUS AND METHOD FOR CONTROLLING THE CAPSTAN MOTOR OF THE VIDEO CASSETTE RECORDER HAVING FUNCTION OF AUTOMATIC FIVE/SLOW PLAYBACK

[75] Inventor: Kwang H. Lee, Kyungki, Rep. of Korea

[73] Assignee: Goldstar Co., Ltd., Seoul, Rep. of Korea

[21] Appl. No.: 979,632

[22] Filed: Nov. 20, 1992

[30] Foreign Application Priority Data

Nov. 20, 1991 [KR] Rep. of Korea ............. 20720/1991

[51] Int. Cl.$^5$ ............................................. H04N 5/95
[52] U.S. Cl. ................................. 358/338; 358/335; 360/77.12
[58] Field of Search ............... 358/335, 310, 312, 338, 358/321; 360/10.2, 10.1, 10.3, 70, 73.05, 73.04, 73.06, 73.07, 73.08, 75, 77.12, 73.09, 73.11, 73.12, 73.13, 73.14; H04N 9/79, 5/76, 5/95, 9/89

[56] References Cited

U.S. PATENT DOCUMENTS

| | | | |
|---|---|---|---|
| 4,716,473 | 12/1987 | Kondo | 360/73.04 |
| 4,737,864 | 4/1988 | Sekiya et al. | 360/10.3 |
| 4,782,405 | 11/1988 | Imai | 360/73.05 |
| 4,935,826 | 6/1990 | Sin et al. | 360/10.3 |
| 5,031,051 | 7/1991 | Kim | 358/312 |

Primary Examiner—Tommy P. Chin
Assistant Examiner—Thai Tran
Attorney, Agent, or Firm—Fleisler, Dubb, Meyer & Lovejoy

[57] ABSTRACT

An apparatus and a method for controlling automatically a fine-slow in a VCR comprises a servo control device for controlling an operation of a capstan motor, a control head for detecting a control pulse from a video tape and applying the detected control pulse to the servo control device, a Schmidt trigger circuit for Schmidt-wave shaping the detected control pulse from the control head, an envelope detector for receiving a playback radio frequency signal and detecting an envelope signal of DC component from the received signal, and a microcomputer for sampling the detected envelope signal from the envelope detector in intervals of a head switching signal of the front and rear of the control pulse in a slow playback interval, A/D-converting the sampled values, comparing the digital sampled values with each other and applying slow control data based on the comparison of the digital sampled values to the servo control device to control shift of the control pulse, the slow control data being data for controlling the capstan motor in a slow mode. The microcomputer compares the sampled values with each other and control shift of the control pulse in a positive (+) or negative (−) direction in accordance with the compared result until the sampled values are the same.

7 Claims, 3 Drawing Sheets

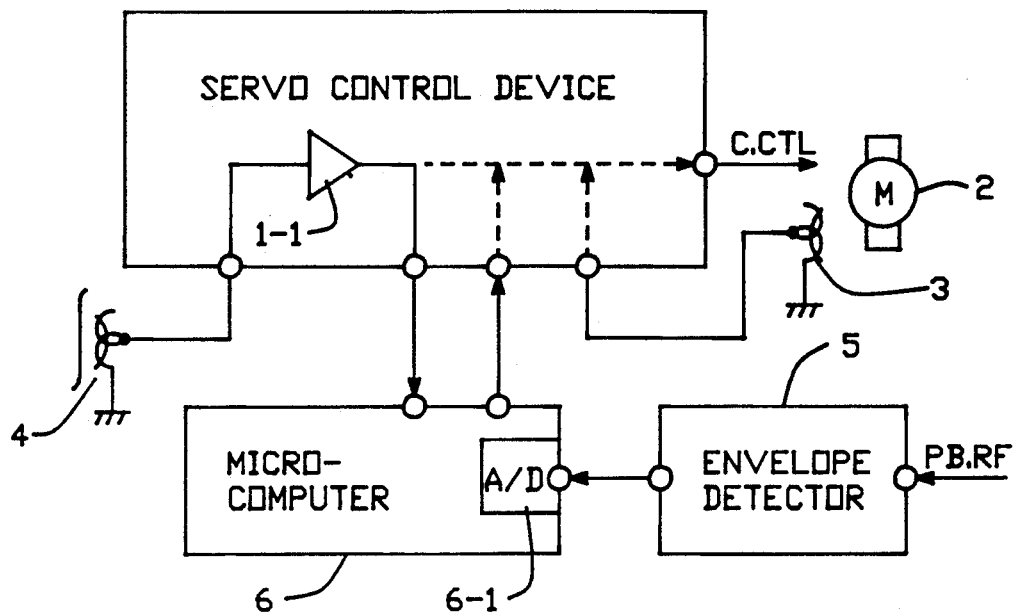
FIG.−1
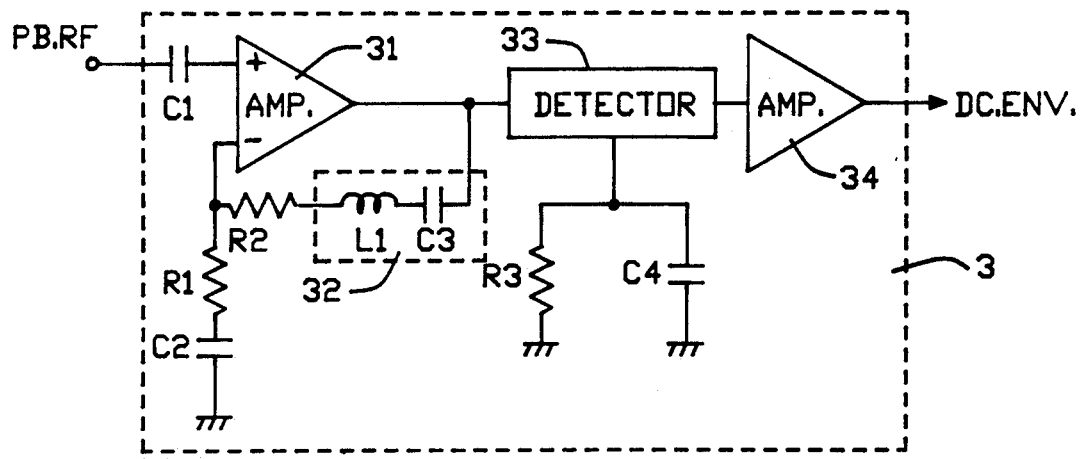
FIG.−2

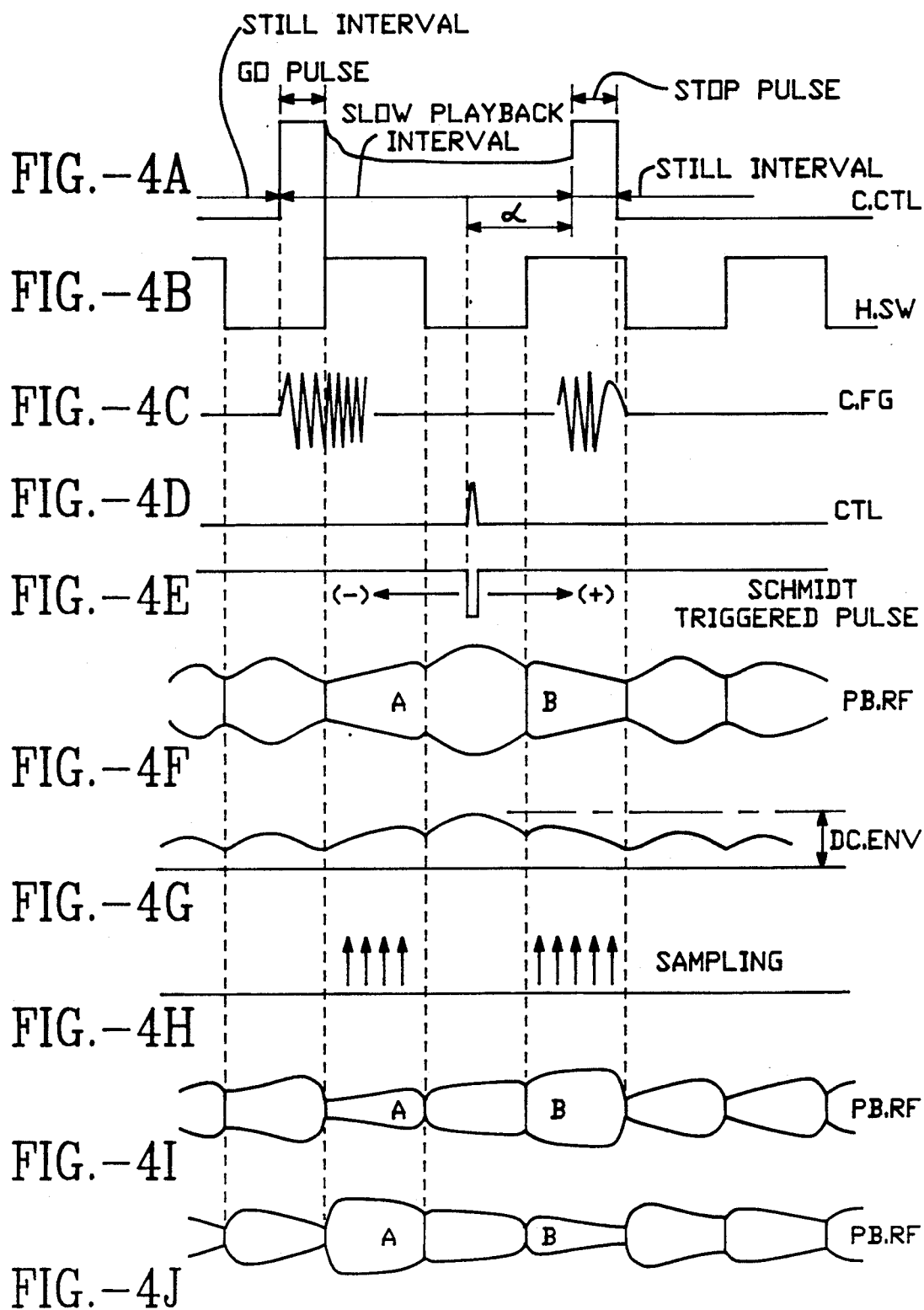

APPARATUS AND METHOD FOR CONTROLLING THE CAPSTAN MOTOR OF THE VIDEO CASSETTE RECORDER HAVING FUNCTION OF AUTOMATIC FIVE/SLOW PLAYBACK

BACKGROUND OF THE INVENTION

1. Field of the Invention

The present invention relates in general to an automatic control of allowing the optimum fine-slow to be performed in a video cassette recorder (VCR), and more particularly to an apparatus and a method for controlling automatically a fine-slow in a VCR wherein a direct current (DC) envelope signal is detected for a slow playback and passed through an analog/digital converter in a microcomputer, thereby allowing the fine-slow to be automatically processed.

2. Description of the Prior Art

In a method of controlling a slow (low speed playback) in a VCR in accordance with the prior art, a control signal is generated from a servo control device in the control of the slow, to allow a video tape to travel in a slow mode. In response to the control signal from the servo control device, a capstan motor allows the video tape to travel at a low speed, thereby causing the VCR to operate in the slow mode. Capstan motor control timing data or tracking data is typically stored as ROM data in the servo control device or generated from a microprocessor in system controller.

In accordance with the control signal for allowing the VCR to operate in the slow mode, a still operation is performed for a predetermined period of time and then a slow playback operation is performed, and these operations are performed repeatedly. In the still interval, a rotation head drum rotates continuously, the video tape not travelling. Namely, in the still interval, the same frame signal is repeatedly played back.

In the slow playback interval, the capstan motor is controlled in three intervals, or GO, NORMAL SPEED and STOP intervals. In the GO interval, the capstan motor is started. In the NORMAL SPEED interval, the capstan motor allows the video tape to travel at a normal speed in the slow mode. In the STOP mode, the capstan motor allows the VCR to stop the fine-slow.

In the GO interval, a relatively high voltage of the control signal is initially generated to make a starting torque of the capstan motor high. After the lapse of a predetermined time period, the capstan motor is driven at the normal speed in the NORMAL SPEED interval. In this NORMAL SPEED interval, a capstan motor control voltage of the control signal is generated such that the video tape travelling speed in the slow mode is 50–70% of that in a normal play mode. In the STOP interval, since the capstan motor may overrun due to an acceleration thereof, a high voltage of the control is generated to drive the capstan motor in reverse to stop it.

However, in the case where the VCR is operated in the slow mode as mentioned above, if the trace of patterns recorded on the video tape is not in accord with that of a video head mounted to a head cylinder due to a tracking swerve, a radio frequency signal on a center track becomes weak, resulting in occurrence of a noise at the lower or upper portion of a screen.

In other words, in the case where the video tape is so positioned that the trace of the patterns (tracks) recorded on the video tape is not in accord with that of the video head, or in the case where the tracking is swerved in a speed change mode because of compatibility relation based on a VHS type or a B type in which the patterns are recorded, the noise may occur at the upper or lower portion of the screen.

For the purpose of removal of the noise on the screen, a tracking up (+)/down (−) key on a remote controller or a switch is utilized to generate a control signal such that the trace of the patterns (tracks) recorded on the video tape is in accord with that of the video head. The use of the tracking up (+)/down (−) key on the remote controller or switch enables the user to watch the optimum video picture on the screen. Nevertheless, it is next to impossible to store slow mode tracking data suitable, respectively, to the video tapes of the various types as ROM data in the servo control device or to program the data in the microprocessor in the system controller. For this reason, in the method of controlling the fine-slow in the VCR in accordance with the prior art, the user must operate the tracking key to set the optimum tracking, so as to watch the optimum video picture on the screen in the slow mode. Moreover, the user may be ignorant of how to use the tracking key in the slow mode. As a result, the user has difficulty in finding the optimum fine-slow.

SUMMARY OF THE INVENTION

Therefore, the present invention has been made in view of the above problem, and it is an object of the present invention to provide an apparatus and a method for controlling automatically a fine-slow in a VCR wherein tracking can automatically be performed in a slow mode so that the user can watch the optimum video picture on a screen.

In accordance with one aspect of the present invention, there is provided an apparatus for controlling automatically a fine-slow in a VCR, comprising: servo control means for controlling an operation of a capstan motor; control head means for detecting a control pulse from a video tape and applying the detected control pulse to said servo control means; Schmidt trigger means for Schmidt-wave shaping the detected control pulse from said control head means; envelope detecting means for receiving a playback radio frequency signal and detecting an envelope signal of DC component from the received signal; and a microcomputer for sampling the detected envelope signal from said envelope detecting means in intervals of a head switching signal of the front and rear of the control pulse in a slow playback interval, A/D-converting the sampled values, comparing the digital sampled values with each other and applying slow control data based on the comparison of the digital sampled values to said servo control means to control shift of the control pulse, the slow control data being data for controlling the capstan motor in a slow mode.

In accordance with another aspect of the present invention, there is provided a method of controlling automatically a fine-slow in a VCR, comprising: an initial slow control step of controlling the slow on the basis of slow preset data upon input of a slow key signal; a sampling step of sampling an envelope signal of a playback radio frequency signal in intervals of a head switching signal of the front and rear of a control pulse, A/D-converting the sampled values and storing the digital sampled values as first and second sampled values; a step of comparing the first and second sampled values with each other; a step of fixing slow control data if the first and second sampled values are the same as a result of the comparison; a step of, if the first sampled value is greater than the second sampled value as a result of the comparison, shifting the slow control data step by step in a positive (+) direction until the first and second sampled values are the same; and a step of, if the first sampled value is smaller than the second sampled value as a result of the comparison, shifting the slow control data step by step in a negative (−) direction until the first and second sampled values are the same.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of an apparatus for controlling automatically a fine-slow in a VCR in accordance with the present invention;

FIG. 2 is a detailed circuit diagram of an envelope detector in the apparatus in FIG. 1 in accordance with the present invention;

FIGS. 4A to 4J are waveform diagrams of signals from respective components in the apparatus in FIG. 1.

DETAILED DESCRIPTION OF THE PREFERRED EMBODIMENTS

Figure 3:
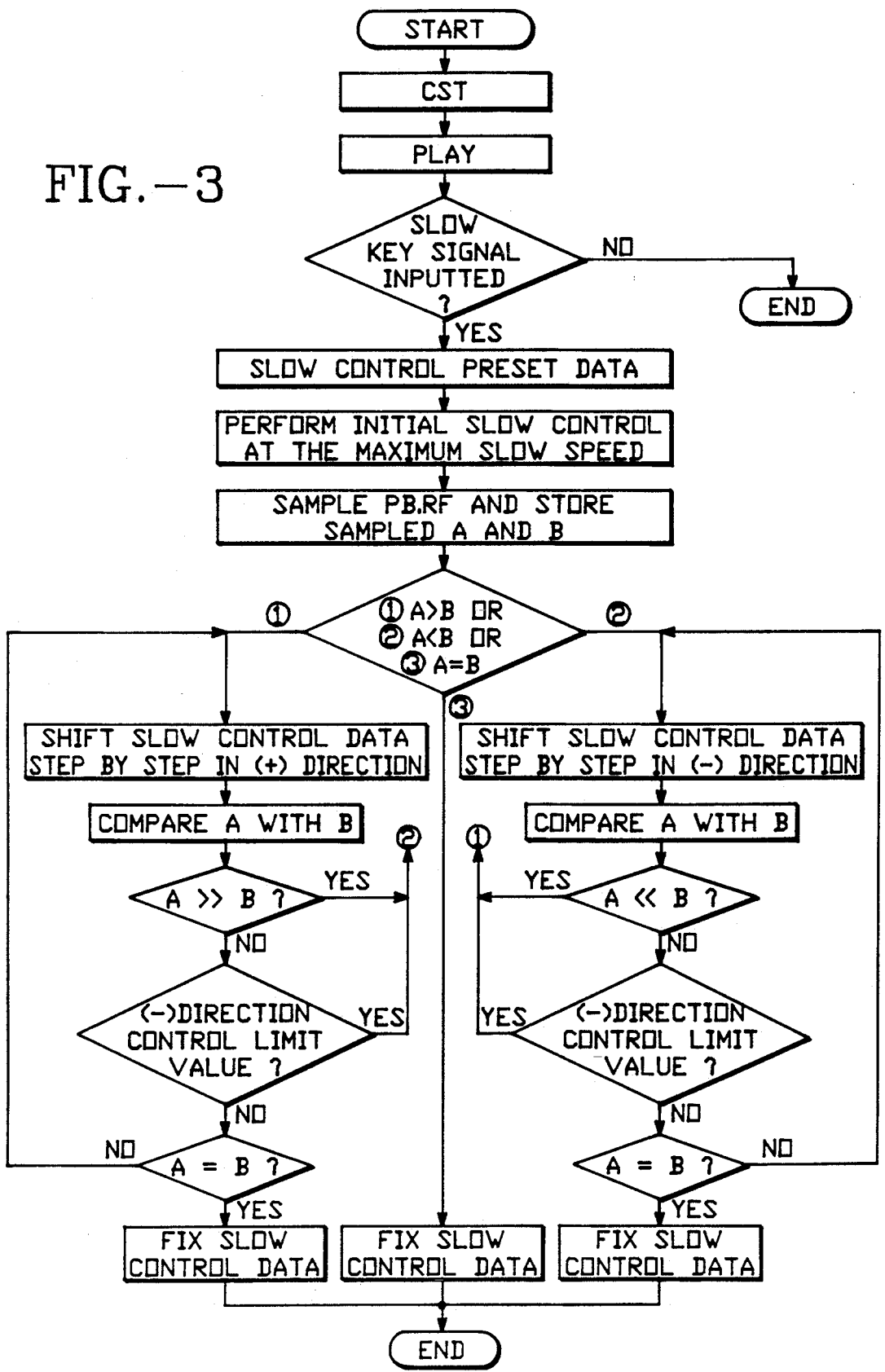
FIG. 3 is a flowchart illustrating an operation of the apparatus in FIG. 1 in accordance with the present invention.

Referring to FIG. 1, there is shown a block diagram of an apparatus for controlling automatically a fine-slow in a VCR in accordance with the present invention. As shown in this figure, the apparatus of the present invention comprises a servo control device 1 for controlling an operation of a capstan motor 2, a speed detector 3 for detecting a rotation speed of the capstan motor 2 and applying a rotation speed signal FG corresponding to the detected rotation speed of the capstan motor 2 to the servo control device 1, a control head 4 for detecting a control pulse CTL from a video tape and applying the detected control pulse CTL to the servo control device 1, a Schmidt trigger circuit 1—1 for Schmidt-wave shaping the detected control pulse CTL from the control head 4, an envelope detector 5 for receiving a playback radio frequency signal PB.RF and detecting an envelope signal of direct current (DC) component from the received signal, and a microcomputer 6 for sampling the detected envelope signal from the envelope detector 5 in intervals of a head switching signal of the front and rear of the control pulse CTL in a slow playback interval, A/D-converting the sampled values, comparing the digital sampled values with each other and applying slow control data based on the comparison of the digital sampled values to the servo control device 1 to control shift of the control pulse CTL, the slow control data being data for controlling the capstan motor 2 in a slow mode.

Referring to FIG. 2, there is shown a detailed circuit diagram of the envelope detector 5 in the apparatus in FIG. 1 in accordance with the present invention. As shown in this drawing, the envelope detector 5 includes a first amplifier 31 having its non-inverting input terminal (+) for inputting the playback radio frequency signal PB,RF through a condenser C1 and its inverting input terminal (−) for inputting a reference voltage through resistors R1 and R2, a resonance circuit 32 having a coil L1 and a condenser C3, for resonating a frequency of an output signal from the first amplifier 31, a detector 33 for detecting a peak value of the output signal from the first amplifier 31, the frequency of which is resonated by the resonance circuit 32, to detect the envelope signal of DC component therefrom, and a second amplifier 34 for amplifying an output signal from the detector 33 to stabilize it.

The operation of the apparatus with the above-mentioned construction in accordance with the present invention will hereinafter be described in detail with reference to FIGS. 3 and 4.

FIG. 3 is a flowchart illustrating an operation of the apparatus in FIG. 1 in accordance with the present invention and FIGS. 4A to 4J are waveform diagrams of the signals from the respective components in the apparatus in FIG. 1. The servo control device 1 outputs a capstan motor control signal C.CTL based on the slow control data from the microcomputer 6 as shown in FIG. 4A in the slow mode, to actuate the capstan motor 2. Namely, initially in the slow control, the servo control device 1 controls the capstan motor 2 in a still mode for a predetermined period of time under the control of the microcomputer 6. In the slow playback interval after the lapse of the predetermined time period, the microcomputer 6 controls such that the servo control device 1 outputs a GO pulse of the capstan motor control signal C.CTL to start the capstan motor 2, so as to allow the video tape to travel. After the GO pulse, the microcomputer 6 controls such that the servo control device 1 drives the capstan motor 2 at a normal speed for a predetermined period of time and then outputs a STOP pulse of the capstan motor control signal C.CTL to stop the capstan motor 2. Thereafter, the servo control device 1 controls the capstan motor 2 in the still mode, again, under the control of the microcomputer 6. Then, the microcomputer 6 continue to control the servo control device 1 to perform the above process repeatedly.

Upon receiving the capstan motor control signal C.CTL from the servo control device 1 as shown in FIG. 4A, the capstan motor 2 rotates to allow the video tape to travel by one frame. At this time, the motor speed detector 3 detects the capstan motor rotation speed signal FG of one frame as shown in FIG. 4C. For example, provided that the capstan motor rotation speed FG is 2160 pulses/sec. in a standard play (SP), the capstan motor rotation speed FG is 72 pulses/frame (=2160/25 frames) in a NTSC system.

When the slow is performed as mentioned above, the control head 4 detects the control pulse CTL as shown in FIG. 4D, which is then applied to the Schmidt trigger circuit 1—1 which Schmidt-wave shapes the detected control pulse CTL from the control head 4 as shown in FIG. 4E. The wave shaped control pulse CTL is applied to the microcomputer 6. The Schmidt trigger circuit 1—1 may be disposed in the servo control device 1.

The microcomputer 6 controls such that the servo control device 1 outputs the STOP pulse after delay time a from the control pulse CTL from the Schmidt trigger circuit 1—1. Namely, the servo control device 1 outputs the STOP pulse after the delay of the predetermined time period a on the basis of a negative falling edge of the Schmidt triggered control pulse CTL.

At this time, in the envelope detector 5, the playback radio frequency signal PB.RF as shown in FIG. 4F which is played back through a playback head and passed through a luminance/color signal processing circuit (not shown) is inputted through the condenser C1 at the non-inverting input terminal (+) of the first amplifier 31. The playback radio frequency signal PB.RF is amplified by a gain of (R2/R1)×(RFp−p) in the first amplifier 31. In the resonance circuit 32, the output frequency of the first amplifier 31 is resonated at a resonance point set on the basis of a carrier component of the playback radio frequency signal PB.RF. The detector 33 peaks the output signal from the first amplifier 31, the frequency of which is resonated by the resonance circuit 32, to detect the peak value P-P therefrom, and outputs the detected peak value P-P as the envelope signal of DC component, and the second amplifier 34 amplifies the output signal from the detector 33 to stabilize it. In result, the envelope signal of DC component as shown in FIG. 4G is applied through the second amplifier 34 in the envelope detector 5 to the microcomputer 6.

The microcomputer 6 samples the detected envelope signal from the envelope detector 5 in the intervals of the head switching signal of the front and rear of the Schmidt-triggered control pulse CTL in the slow interval, A/D-converts the sampled values through an analog/digital converter 6-1 therein and stores the digital sampled values as first and second sampled values A and B therein. The microcomputer 6 then compares the first and second sampled values A and B with each other and controls the shift of the control pulse CTL in a positive (+) or negative (−) direction in accordance with the compared result, so as to make the first and second sampled values A and B the same.

The method of controlling automatically the fine-slow in the VCR under the control of the microcomputer 6 as mentioned above will hereinafter be described in detail with reference to FIG. 3.

Upon pushing a slow key on a remote controller, there is first performed an initial slow control step of controlling the slow on the basis of slow preset data. The slow control in this initial slow control step is performed at the maximum slow speed for rapid execution of the slow auto tracking.

There is then performed a sampling step of sampling the envelope signal of the playback radio frequency signal PB.RF in the intervals of the head switching signal of the front and rear of the control pulse CTL detected in the initial slow control step, A/D-converting the sampled values and storing the digital sampled values as the first and second sampled values A and B as shown in FIG. 4H.

There is then performed a step of comparing the first and second sampled values A and B with each other. If the first and second sampled values A and B are the same (A=B) as a result of the comparison, there is performed a step of fixing slow control data.

If the first sampled value A of the envelope signal of the playback radio frequency signal PB.RF in the interval of the head switching signal of the front of the control pulse CTL is greater than the second sampled value B as shown in FIG. 4J as a result of the comparison, i.e., A>B, there is performed a step of shifting the slow control data step by step (herein, one step is several hundred μsec.) in the positive (+) direction until the first and second sampled values A and B are the same.

The step of shifting the slow control data step by step in the positive (+) direction includes a step of shifting the slow control data step by step in the positive (+) direction, a step of comparing the first and second sampled values A and B with each other, a step of, if the first sampled value A is much greater than the second sampled value B as a result of the comparison (A>>B), i.e., if a difference between the first and second sampled values A and B is greater than a predetermined reference value as a result of the comparison, or if the slow control data is a negative (−) direction control limit value, returning to a step of shifting the slow control data step by step in the negative (−) direction as will be described later, a step of, if the difference between the first and second sampled values A and B is not greater than the predetermined reference value as a result of the comparison, if the slow control data is not the negative (−) direction control limit value and if the first and second sampled values A and B are not the same, returning to the step of shifting the slow control data step by step in the positive (+) direction, and a step of, if the difference between the first and second sampled values A and B is not greater than the predetermined reference value as a result of the comparison, if the slow control data is not the negative (−) direction control limit value and if the first and second sampled values A and B are the same, fixing the slow control data.

On the other hand, if the second sampled value B of the envelope signal of the playback radio frequency signal PB.RF in the interval of the head switching signal of the rear of the control pulse CTL is greater than the first sampled value A as shown in FIG. 4I as a result of the comparison, i.e., A<B, there is performed a step of shifting the slow control data step by step in the negative (−) direction until the first and second sampled values A and B are the same.

The step of shifting the slow control data step by step in the negative (−) direction includes a step of shifting the slow control data step by step in the negative (−) direction, a step of comparing the first and second sampled values A and B with each other, a step of, if the first sampled value A is much smaller than the second sampled value B as a result of the comparison (A<<B), i.e., if a difference between the first and second sampled values A and B is smaller than a predetermined reference value as a result of the comparison, or if the slow control data is a positive (+) direction control limit value, returning to the above step of shifting the slow control data step by step in the positive (+) direction, a step of, if the difference between the first and second sampled values A and B is not smaller than the predetermined reference value as a result of the comparison, if the slow control data is not the positive (+) direction control limit value and if the first and second sampled values A and B are not the same, returning to the step of shifting the slow control data step by step in the negative (−) direction, and a step of, if the difference between the first and second sampled values A and B is not smaller than the predetermined reference value as a result of the comparison, if the slow control data is not the positive (+) direction control limit value and if the first and second sampled values A and B are the same, fixing the slow control data.

For example, provided that the control pulse CTL is detected in a low interval of the head switching signal as shown in FIG. 4B, the positive (+) direction control limit value and the negative (−) direction control limit value are determined according to whether the control pulse CTL gets out of the low interval of the head switching signal when it is shifted in the positive (+) direction and negative (−) direction.

The discrimination whether the first sampled value A is much greater or smaller than the second sampled value B is made according to whether the difference between the first and second sampled values A and B is greater or smaller than the predetermined reference value, as mentioned above.

In this manner, the slow control data is fixed when the first and second sampled values A and B are the same and the slow control is performed on the basis of the fixed slow control data. Therefore, the fine-slow can automatically be performed.

As hereinbefore described, according to the present invention, the microcomputer samples the detected envelope signal of the playback radio frequency signal in the intervals of the head switching signal of the front and rear of the control pulse, compares the sampled values with each other and controls the shift of the control pulse in the positive (+) or negative (−) direction in accordance with the compared result, thereby enabling the fine-slow to be automatically performed. Therefore, the user can watch the optimum video picture on the screen in the slow mode.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for controlling automatically a fine-slow movement of a video tape in a VCR, comprising:
    servo control means for controlling a capstan motor with a capstan drive signal, said capstan drive signal active over a slow playback interval commencing with a front and ending with a rear, and said drive signal operative under control of slow control data to control the capstan motor to move the video tape;
    control head means for detecting a control pulse from the video tape at a control pulse location between the front and rear of the playback interval and for applying the detected control pulse to said servo control means;
    Schmidt trigger means for Schmidt-wave shaping the detected control pulse from said control head means;
    envelope detecting means for receiving a radio frequency playback signal from the video tape and detecting a DC component envelope signal from the playback signal; and
    a microcomputer for sampling the detected envelope signal from said envelope detecting means, forming sampled first values proportional to the portion of the detected envelope signal between the front of the playback interval and the control pulse location, forming sampled second values proportional to the portion of the detected envelope signal between the control pulse location and the rear of the playback interval, A/D-converting the sampled first and second values to form first and second digital values, comparing the first digital value with the second digital value to provide a greater-than result or a less-than result, providing said slow control data to said servo control means to control said capstan drive signal such that said control pulse location is moved, relative to said front and rear of the playback interval, in one direction in response to said greater-than result and in the opposite direction in response to said less-than result whereby the video tape is tracked over the playback interval.

2. An apparatus, as set forth in claim 1, wherein said envelope detecting means includes:
    a first amplifier having a non-inverting input terminal (+) for inputting the playback signal through a first condenser and an inverting input terminal (−) for inputting a reference voltage through first and second resistors;
    a resonance circuit having a coil and a second condenser, for resonating a frequency of an output signal from said first amplifier;
    a detector for detecting a peak value of the output signal from said first amplifier, the frequency of which is resonated by said resonance circuit, to detect the DC component envelope signal therefrom; and
    a second amplifier for amplifying and stabilizing an output signal from said detector.

3. A method for controlling automatically a fine-slow movement of a video tape in a VCR, comprising:
    controlling a capstan motor with servo control means using a capstan drive signal, said capstan drive signal active over a slow playback interval commencing with a front and ending with a rear, and said capstan drive signal operative under control of slow control data to control the capstan motor to move the video tape;
    detecting a control pulse from the video tape at a control pulse location between the front and rear of the playback interval and applying the detected control pulse to said servo control means;
    envelope detecting an envelope signal from a radio frequency playback signal from the video tape;
    sampling the detected envelope signal from said envelope detecting means;
    forming sampled first values proportional to the portion of the detected envelope signal between the front of the playback interval and the control pulse location;
    forming a sampled second values proportional to the portion of the detected envelope signal between the control pulse location and the rear of the playback interval;
    A/D-converting the sampled first and second values to form first and second digital values;
    comparing the first digital value with the second digital value to provide a greater-than result or a less-than result;
    providing said slow control data to said servo control means to control said capstan drive signal such that said control pulse location is moved, relative to said front and rear of the playback interval, in one direction in response to said greater-than result and in the opposite direction in response to said less-than result whereby the video tape is tracked over the playback interval.

4. A method of claim 3 wherein said comparing the first digital value with the second digital value provides said greater-than result, an equal-to result, and said less-than result,
    fixing said slow control data if the first and second digital values are the same as a result of the comparison;
    if the first digital value is greater than the second digital value as a result of the comparison, shifting the slow control data step by step in a positive (+)

direction until the first and second digital values are the same; and if the first digital value is smaller than the second digital value as a result of the comparison, shifting the slow control data step by step in a negative (−) direction until the first and second digital values are the same.

5. A method as set forth in claim 4, wherein said step of shifting the slow control data step by step in the positive (+) direction includes:

a step of, if a difference between the first and second sampled values is greater than a predetermined reference value as a result of the comparison or if the slow control data is in a negative (−) direction, returning to said step of shifting the slow control data step by step in the negative (−) direction;

a step of, if the difference between the first and second sampled values is not greater than the predetermined reference value as a result of the comparison, if the slow control data is not in the negative (−) direction and if the first and second sampled values are not the same, returning to said step of shifting the slow control data step by step in the positive (+) direction; and a step of, if the difference between the first and second sampled values is not greater than the predetermined reference value as a result of the comparison, if the slow control data is not in the negative (−) direction and if the first and second sampled values are the same, fixing the slow control data.

6. A method as set forth in claim 4, wherein said step of shifting the slow control data step by step in the negative (−) direction includes:

a step of, if a difference between the first and second sampled values is smaller than a predetermined reference value as a result of the comparison or if the slow control data is in a positive (+) direction, returning to said step of shifting the slow control data step by step in the positive (+) direction;

a step of, if the difference between the first and second sampled values is not smaller than the predetermined reference value as a result of the comparison, if the slow control data is not in the positive (+) direction and if the first and second sampled values are not the same, returning to said step of shifting the slow control data step by step in the negative (−) direction; and a step of, if the difference between the first and second sampled values is not smaller than the predetermined reference value as a result of the comparison, if the slow control data is not in the positive (+) direction and if the first and second sampled values are the same, fixing the slow control data.

7. An apparatus for automatically controlling movement of a video tape in a VCR comprising:

servo control means for controlling a capstan motor with a capstan drive signal, said capstan drive signal active over a playback interval, said playback interval commencing with a controllable GO pulse in the front and a STOP pulse in the rear, said drive signal for driving the capstan motor to move the video tape;

control head means for detecting a control pulse from the video tape at a control pulse location between the front and rear of the playback interval;

envelope detecting means for receiving a radio frequency playback signal from the video tape and detecting an envelope signal from the playback signal; and a microcomputer for sampling the detected envelope signal from said envelope detecting means, forming sampled first values proportional to the portion of the detected envelope signal between the front of the playback interval and the control pulse location, forming sampled second values proportional to the portion of the detected envelope signal between the control pulse location and the rear of the playback interval, A/D-converting the sampled first and second values to form first and second digital values, comparing the first digital value with the second digital value to provide a result, providing said result to said servo control means to control the time of the GO pulse and the STOP pulse so as to tend to make said first and second digital values equal whereby the video tape is tracked over the playback interval.

* * * * *